(12) United States Patent
Palanki et al.

(10) Patent No.: US 8,942,272 B2
(45) Date of Patent: Jan. 27, 2015

(54) METHOD AND APPARATUS FOR ENABLING SIGNAL PROCESSING IN A MULTIPLE ANTENNA REPEATER

(75) Inventors: Ravi Palanki, San Diego, CA (US); Dexu Lin, San Diego, CA (US); Kapil Bhattad, San Diego, CA (US); Dhananjay Ashok Gore, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 544 days.

(21) Appl. No.: 13/194,731

(22) Filed: Jul. 29, 2011

(65) Prior Publication Data

US 2012/0027054 A1   Feb. 2, 2012

Related U.S. Application Data

(60) Provisional application No. 61/369,978, filed on Aug. 2, 2010, provisional application No. 61/433,036, filed on Jan. 14, 2011.

(51) Int. Cl.
| | |
|---|---|
| H04B 3/36 | (2006.01) |
| H04B 7/17 | (2006.01) |
| H04B 17/02 | (2006.01) |
| H04L 25/20 | (2006.01) |
| H04L 25/52 | (2006.01) |
| H04B 7/155 | (2006.01) |
| H04B 7/06 | (2006.01) |
| H04B 7/08 | (2006.01) |
| H04B 7/10 | (2006.01) |

(52) U.S. Cl.
CPC .......... *H04B 7/15571* (2013.01); *H04B 7/0671* (2013.01); *H04B 7/084* (2013.01); *H04B 7/0857* (2013.01); *H04B 7/0894* (2013.01); *H04B 7/10* (2013.01); *H04B 7/155* (2013.01)
USPC .......................................................... 375/211

(58) Field of Classification Search
USPC .......................................................... 375/211
See application file for complete search history.

(56) References Cited

U.S. PATENT DOCUMENTS

2005/0002468 A1 * 1/2005 Walton et al. ................. 375/267
2008/0099896 A1   5/2008 Shen et al.
(Continued)

FOREIGN PATENT DOCUMENTS

| EP | 1615354 A2 | 1/2006 |
|---|---|---|
| WO | WO2010021597 A1 | 2/2010 |
| WO | WO2010050686 A2 | 5/2010 |

OTHER PUBLICATIONS

International Search Report and Written Opinion—PCT/US2011/046203—ISA/EPO—Nov. 8, 2011.

*Primary Examiner* — Michael Neff
*Assistant Examiner* — Nader Bolourchi
(74) *Attorney, Agent, or Firm* — Arent Fox LLP

(57) ABSTRACT

Systems and methodologies are described that enable serving cell selection in a wireless network with a multiple antenna repeater operable to support MIMO communications. In one example, a repeater using orthogonal frequency division multiplexing on the downlink can be equipped to receive, by one or more receive antennas, one or more signals using one or more radio frequency (RF) isolation schemes. The repeater can further be equipped to amplify and delay the one or more signals using one or more combination schemes. Moreover, the repeater can be equipped to transmit, by one or more transmit antennas, the amplified and delayed one or more signals, wherein at least one of the one or more receive antennas or the one or more transmit antennas includes two or more antennas.

56 Claims, 7 Drawing Sheets

(56) References Cited

U.S. PATENT DOCUMENTS

| | | | |
|---|---|---|---|
| 2010/0136903 A1* | 6/2010 | Lee et al. | 455/17 |
| 2010/0224725 A1* | 9/2010 | Perlman et al. | 244/1 R |
| 2010/0260243 A1* | 10/2010 | Ihm et al. | 375/219 |
| 2012/0315916 A1* | 12/2012 | Van Phan et al. | 455/442 |

* cited by examiner

METHOD AND APPARATUS FOR ENABLING SIGNAL PROCESSING IN A MULTIPLE ANTENNA REPEATER

CROSS-REFERENCE TO RELATED APPLICATION(S)

This application claims the benefit of U.S. Provisional Application Ser. No. 61/369,978, entitled "METHOD AND APPARATUS FOR ENABLING SIGNAL PROCESSING IN A MULTIPLE ANTENNA REPEATER" and filed on Aug. 2, 2010, and U.S. Provisional Application Ser. No. 61/433,036, entitled "METHOD AND APPARATUS FOR ENABLING SIGNAL PROCESSING IN A MULTIPLE ANTENNA REPEATER" and filed on Jan. 14, 2011, which are expressly incorporated by reference herein in their entirety.

BACKGROUND

1. Field

The present disclosure relates generally to communication, and more specifically to techniques for enabling serving cell selection in a wireless network with a multiple antenna repeater operable to support multiple-input-multiple-output (MIMO) communications.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include, code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and MIMO antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with enabling serving cell selection in a wireless network with a multiple antenna repeater operable to support MIMO communications. In one example, a repeater using orthogonal frequency division multiplexing on the downlink can be equipped to receive, by one or more receive antennas, one or more signals using one or more radio frequency (RF) isolation schemes. The repeater can further be equipped to amplify and delay the one or more signals using one or more combination schemes. Moreover, the repeater can be equipped to transmit, by one or more transmit antennas, the amplified and delayed one or more signals, wherein at least one of the one or more receive antennas or the one or more transmit antennas includes two or more antennas.

According to related aspects, a method for a repeater in a communication system using orthogonal frequency division multiplexing on the downlink is provided. The method can include receiving, by one or more receive antennas, one or more signals using one or more RF isolation schemes. The method can also include amplifying and delaying the one or more signals using one or more combination schemes. Moreover, the method can include transmitting, by one or more transmit antennas, the amplified and delayed one or more signals, wherein at least one of the one or more receive antennas or the one or more transmit antennas includes two or more antennas.

Another aspect relates to a repeater for wireless communications in a communication system using orthogonal frequency division multiplexing on the downlink. The repeater can include means for receiving, by one or more receive antennas, one or more signals using one or more RF isolation schemes. The repeater can also include means for amplifying and delaying the one or more signals using one or more combination schemes. Moreover, the repeater can include means for transmitting, by one or more transmit antennas, the combined one or more signals, wherein at least one of the one or more receive antennas or the one or more transmit antennas includes two or more antennas.

Yet another aspect relates to at least one processor configured to facilitate wireless communications for a repeater in a communication system using orthogonal frequency division multiplexing on the downlink. The at least one processor can include a first module for receiving, by one or more receive antennas, one or more signals using one or more RF isolation schemes. The at least one processor can also include a second module for amplifying and delaying the one or more signals using one or more combination schemes. Moreover, the at least one processor can include a third module for transmitting, by one or more transmit antennas, the amplified and delayed one or more signals, wherein at least one of the one or more receive antennas or the one or more transmit antennas includes two or more antennas.

Still another aspect relates to a computer program product, which can have a computer-readable medium including code for causing at least one computer to receive, by one or more receive antennas, one or more signals using one or more radio frequency (RF) isolation schemes. The computer-readable medium can also comprise code for causing the at least one computer to amplify and delay the one or more signals using one or more combination schemes. Moreover, the computer-readable medium can also comprise code for causing the at least one computer to transmit, by one or more transmit antennas, the amplified and delayed one or more signals, wherein at least one of the one or more receive antennas or the one or more transmit antennas includes two or more antennas.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
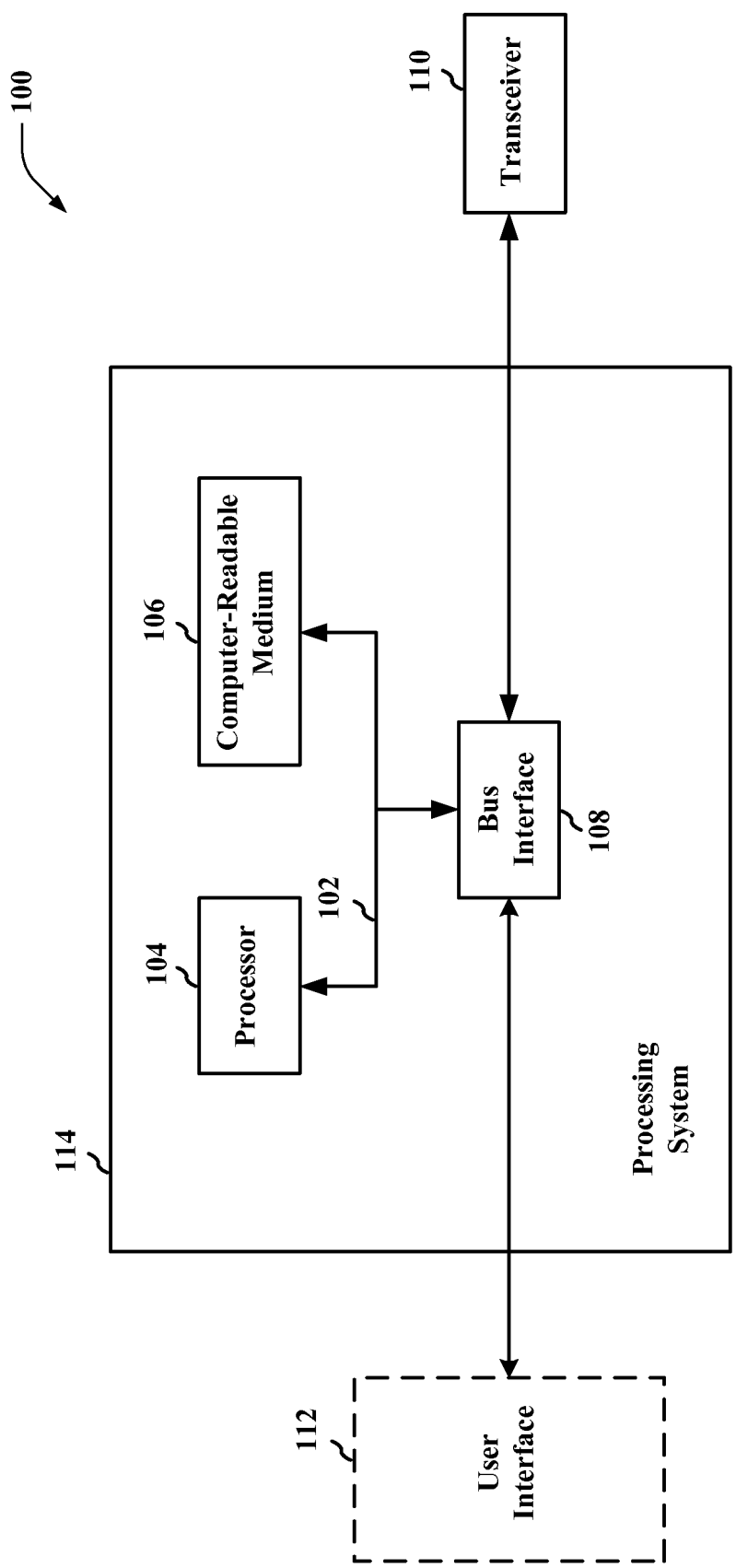
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Generally, a repeater may provide an entity capable of augmenting the coverage of cellular networks. A repeater works by receiving a wireless signal and retransmitting an amplified version of the received signal. A User Equipment (UE) 206 may experience a low signal level at a cell 202 edge could see improved signal to interference plus noise ratio (SINR) level if it is in the vicinity of a repeater 216. Currently available repeater solutions may not be ideal for LTE environments, which use orthogonal frequency division multiplexing on the downlink. The current techniques, which incorporate multiple antennas and allow for intelligent processing of received signals, may significantly enhance performance in such systems.

Further, repeaters can be designed to be single-in single-out (SISO), e.g., having a single receive antenna and a single transmit antenna. This design works well when both an evolved NodeB (eNodeB) and UE have a single antenna. However, when the eNodeBs or UEs have multiple antennas, SISO repeaters may not function effectively.

During operation in a coverage area without a repeater, a UE may operate with second order diversity because of dual receive antennas. However, when a SISO repeater is introduced, the SINR at the UE may be upper bounded by the SINR at the receiver of the repeater, and the UE may operate with first order diversity. This may be limiting for technologies such as LTE which use receiver diversity. One way to address the loss-of-diversity issue is to introduce multiple antennas at the receiver and/or transmitter of the repeater, e.g., by utilizing a MIMO repeater.

Figure 2:
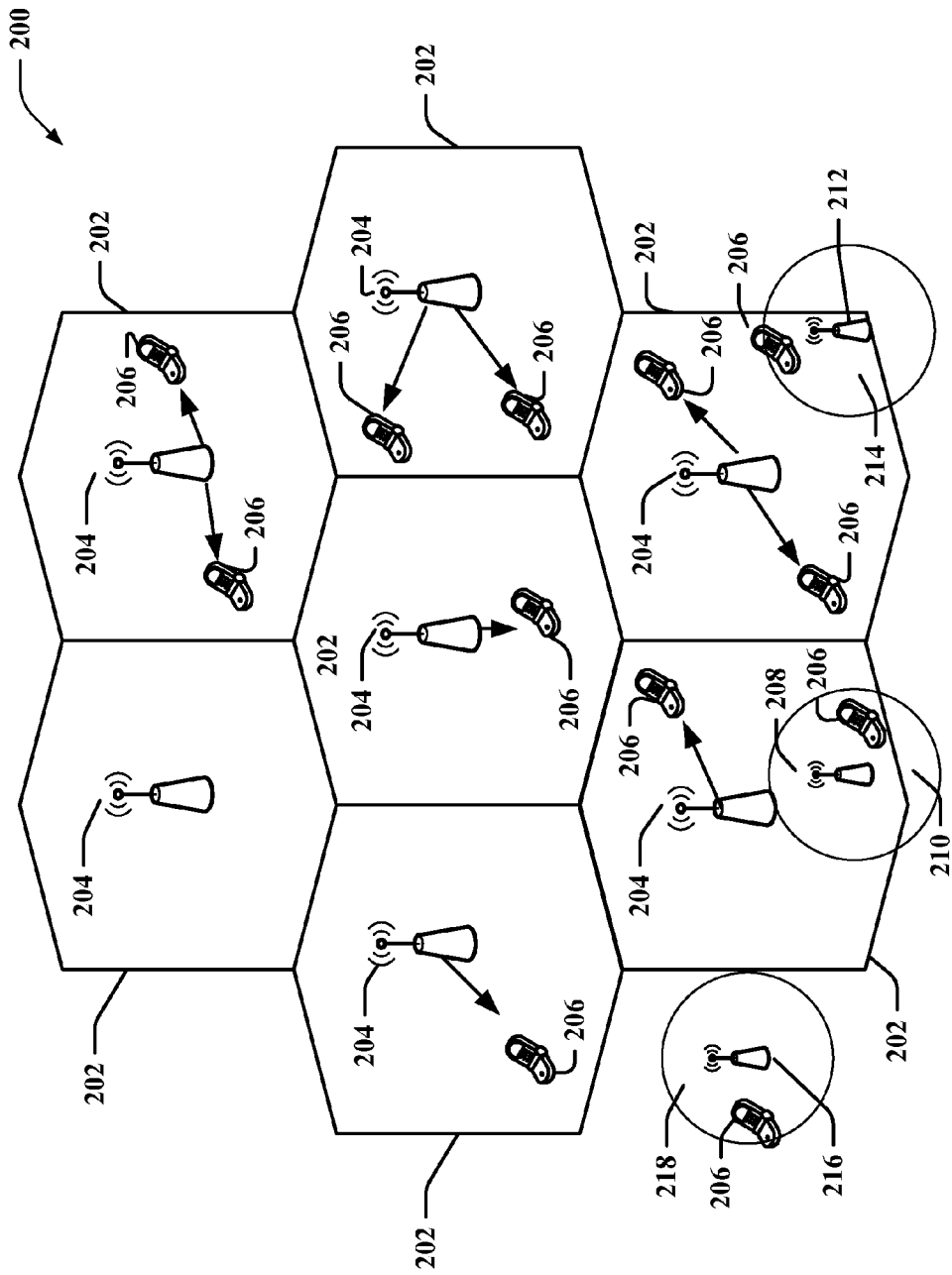
FIG. 2 shows a wireless communication network.
Figure 3:
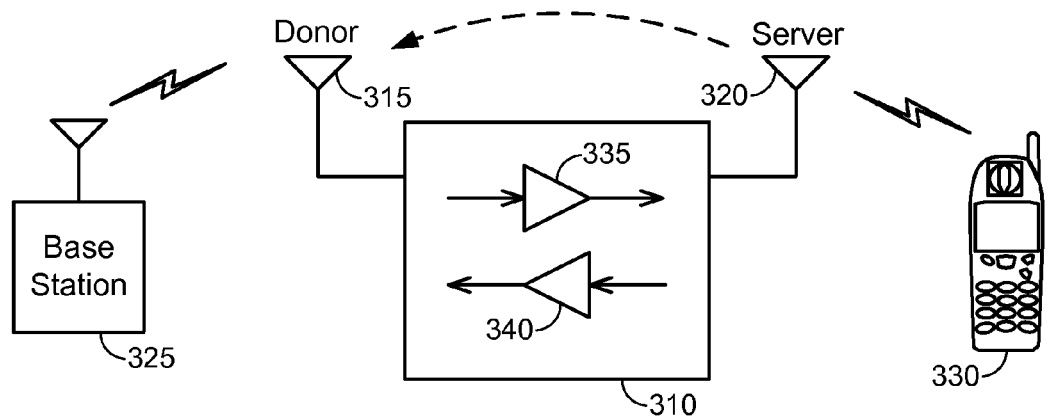
FIG. 3 is a diagram of a repeater in a wireless communication network.

FIG. 2 is a diagram illustrating an example of an access network in an LTE network architecture. In this example, the access network 200 is divided into a number of cellular regions (cells) 202. One or more lower power class eNodeBs 208, 212 may have cellular regions 210, 214, respectively, that overlap with one or more of the cells 202. The lower power class eNodeBs 208, 212 may be femto cells (e.g., home eNodeBs (HeNBs)), pico cells, or micro cells. A higher power class or macro eNodeB 204 is assigned to a cell 202 and is configured to provide an access point for all the UEs 206 in the cell 202. There is no centralized controller in this example of an access network 200, but a centralized controller may be used in alternative configurations. The eNodeB 204 is responsible for all radio related functions including radio bearer control, admission control, mobility control, scheduling, security, and connectivity to a serving gateway. Additionally, access network 200 may include repeater 216 operable to provide coverage to UE 206 within coverage region 218.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 204 may have multiple antennas supporting MIMO technology. The use of MIMO technology enables the eNodeB 204 to exploit the spatial domain to support spatial multiplexing, beamforming, and transmit diversity.

Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream and then transmitting each spatially precoded stream through a different transmit antenna on the downlink. The spatially precoded data streams arrive at the UE(s) 206 with different spatial signatures, which enables each of the UE(s) 206 to recover the one or more the data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

In general, a repeater is a device that receives a signal, amplifies the signal, and transmits the amplified signal. FIG.

3 shows a basic diagram of a repeater 310, in the context of a cellular telephone system. Repeater 310 includes a donor antenna 315 as an example network interface to network infrastructure such as an eNodeB 325. Repeater 310 also includes a server antenna 320 (also referred to as a "coverage antenna") as a mobile interface to UE 330. In operation, donor antenna 315 is in communication with eNodeB 325 over a backhaul link, while server antenna 320 is in communication with UEs 330 over an access link.

In repeater 310, signals from eNodeB 325 are amplified using forward link circuitry 335, while signals from UE 330 are amplified using reverse link circuitry 340. Many configurations may be used for forward link circuitry 335 and reverse link circuitry 340.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency.

Figure 4:
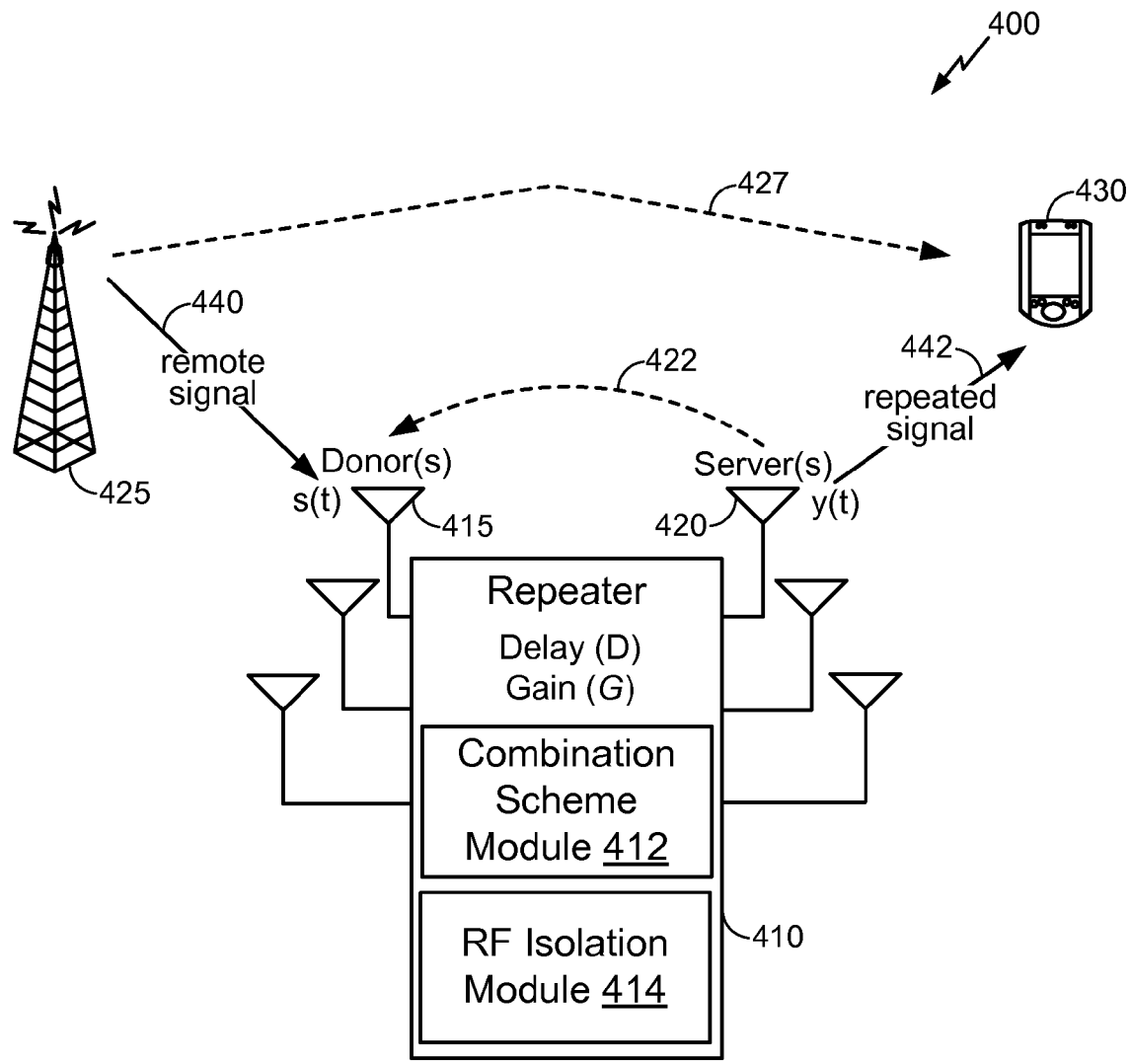
FIG. 4 is another diagram of a repeater in a wireless communication network according to an aspect.

FIG. 4 shows a diagram of an operating environment 400 for a repeater 410 according to certain embodiments of the current disclosure. The example of FIG. 4 illustrates forward link transmissions: e.g., a remote signal 440 from an eNodeB 425 is intended for a UE 430. A repeater, such as repeater 410, may be used in environment 400 to generate a repeated signal 442, if an un-repeated signal along the path 427 between eNodeB 425 and UE 430 would not provide sufficient signal for effective voice and/or data communications received at UE 430. Repeater 410 with a gain G and a delay L is configured to repeat a signal received from eNodeB 425 on one or more donor antenna(s) 415 to UE 430 using one or more server antenna(s) 420. Repeater 410 includes forward link circuitry for amplifying and transmitting signals received from the base station 425 to mobile device 430 through donor antenna(s) 415 and server antenna(s) 420. Repeater 410 may also include reverse link circuitry for amplifying and transmitting signals from UE 430 back to eNodeB 425.

Generally, where in a single input-single-output (SISO) environment 400, at repeater 410, the remote signal s(t) is received as an input signal and the remote signal s(t) is repeated as a repeated or amplified signal y(t) as defined in equation (1).

$$y(t) = Gs(t-L) \quad (1)$$

Ideally, the gain G would be large, the inherent delay L of the repeater would be small, the input SINR would be maintained at the output of repeater 410 (this can be of particular importance for data traffic support), and only desired carriers would be amplified.

In practice, the gain G of repeater 410 is limited by the isolation between donor antenna 415 and server antenna 420. If the gain G is too large, the repeater can become unstable due to signal leakage. Signal leakage refers to the phenomenon where a portion of the signal that is transmitted from one antenna (in FIG. 4, server antenna 420) is received by the other antenna (in FIG. 4, donor antenna 415), as shown by the feedback path 422 in FIG. 4. Without radio frequency (RF) isolation schemes such as interference cancellation or other techniques, the repeater would amplify this feedback signal, also referred to as the leakage signal, as part of its normal operation, and the amplified feedback signal would again be transmitted by server antenna 420. The repeated transmission of the amplified feedback signal due to signal leakage and high repeater gain G can lead to repeater instability. Additionally, signal processing in repeater 410 has an inherent non-negligible delay L. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

In one aspect, repeater 410 may include combination scheme module 412 and RF isolation scheme module 414. In one aspect, combination scheme module 412 may be operable to apply one or more combination schemes to a received signal to maintain signal integrity, for example, to maintain MIMO communications, diversity, etc. In one aspect, selection of an applicable combination scheme may be determined through analysis of equation (2)

$$y(m) = \sum_{n=1}^{N} x_n(t - D_{n,m}) \cdot A_{n,m} \quad (2)$$

Where $x_n$ (n=1, . . . ,N) are the received signals on N Rx antennas (e.g. donor antennas 415) of the repeater 410; y(m) (m=1, . . . ,M) are the transmitted signals on M Tx antennas (e.g., server antennas 420) of repeater 410; $D_{n,m}$ is an element in a delay matrix which may be applied to the signal received on the n-th Rx antenna at the m-th Tx antenna; and $A_{n,m}$ is an element in a complex-valued scaling factor matrix which may be applied to the signal received on the n-th Rx antenna at the m-th Tx antenna. As a complex-value scaling factor, the magnitude of $A_{n,m}$ represents the gain in signal strength applied to the received signal, and the phase of $A_{n,m}$ represents the phase rotation applied to the received signal. In one aspect, $D_{n,m}$ and $A_{n,m}$ may both be a function of the correlation properties of the Tx and Rx antennas. In another aspect, combination scheme module 412 may adjust the delays ($D_{n,m}$) and complex-valued scaling factors ($A_{n,m}$) statically, semi-statically or dynamically to improve the system performance. For example, scaling factors ($A_{n,m}$) may be used for antenna selection and aggregation, and delays ($D_{n,m}$) for diversity improvement. Here, the set of gains may be viewed as a MIMO matrix transformation.

In one aspect, antennas 415 and 420 for the repeater 410 may be chosen and/or oriented in accordance with a suitable polarization to further improve diversity. For example, cross-polarized antennas may be used for one or both of the donor antennas 415 and the server antennas 420. In an example with at least partially cross-polarized antennas at the donor antennas 415, one subset of the donor antennas 415 may be vertically polarized and another subset of the donor antennas 415 may be horizontally polarized. A similar scheme may be utilized at the server antennas 420, wherein the server antennas are at least partially cross-polarized. According to various aspects of the disclosure, there need not be any relationship between a polarization scheme utilized at the donor antennas 415 and the server antennas 420. That is, a horizontally polarized Tx antenna need not necessarily transmit a signal corresponding to a signal received from a horizontally polarized Rx antenna.

In one aspect, combination scheme module 412 may determine which scheme to use depending on the number of donor antennas 415 and server antennas 420 available. For example, when the number of available Rx and Tx antennas is equal, then each Tx antenna may retransmit an amplified version of the signal received on a corresponding Rx antenna. As such there may be a one-to-one mapping between Tx and Rx antennas. In another example, when the number of Tx antennas is less than the number of Rx antennas, the Tx antennas may retransmit signals from a selected Rx antenna or a combination of signals from multiple Rx antennas. In such an aspect, for example, with two Rx antennas and one Tx antenna, the repeater may transmit the sum of signals received on the 2 Rx antennas, or the combination of signals from 2 Rx antennas through signal addition, maximum ratio combining, equal gain combining, etc. In one aspect, maximum ratio combining may account for when a signal comes through several wireless channels and is received as multiple streams. These streams may be combined in such a way resulting in the largest possible SNR. In particular, $A_{n,m}$ for each received stream may be proportional to the channel response experienced by that stream, and inversely proportional to the noise level experienced by that stream. In another aspect, equal gain combining may be operable when an exact amplitude of a channel response experienced by each signal stream is not known, but the phase is known. The $A_{n,m}$ for each received stream may be a constant amplitude, and the phase of the $A_{n,m}$ may be equal to the phase of the channel response experienced by each stream. Both maximum ratio combining and equal gain combining use at least partial knowledge of the wireless channel between the transmitter and the repeater. This partial knowledge may be obtained by a channel estimator at the repeater. In another example, when the number of Tx antennas is more than the number of Rx antennas, different Tx antennas may transmit substantially identical waveforms. In such an aspect, for example, with one Rx antenna and two Tx antennas, the repeater may transmit substantially the same signals on two Tx antennas, both being amplified versions of the signal received on the Rx antenna. Further, in one aspect, combination scheme module 412 may be operable to combine inputs across antennas with variable delays in order to get delay diversity, e.g., cyclic delay diversity. Here, in one example, the same signal may be transmitted from multiple Tx antennas utilizing different delays.

In another aspect, RF isolation scheme module 414 may be operable to implement one or more RF isolations schemes to reduce potential feedback 422 from the Tx antennas to the Rx antennas of the repeater. In one aspect, isolation scheme module 414 may enable repeater 410 to process signals using spatial separation. In one aspect, the spatial separation may be a distance beyond which interference is below a defined threshold. For example, donor antennas 415 and server antennas 420 of repeater 410 may be placed with sufficient spatial separation so that the donor antennas 415 may be exposed to little interference from the server antennas 420. For example, the donor antennas 415 may be placed on a rooftop while the server antennas are placed indoors 420. In another aspect, isolation scheme module 414 may enable repeater 410 to process signals using interference cancellations engines. For example, interference cancellation engines can be used to cancel signals picked up by the donor antennas 415 that come from the server antennas 420. Assuming M server antennas 420 and N donor antennas 415, M×N interference cancellation engines may be used as each donor antenna 415 may cancel M signal streams from M server antennas 420, thereby using M interference cancellation engines per donor antenna 415. In one aspect, the $A_{n,m}$ obtainable by repeater 410 may be dependent on how much signal isolation may be achieved.

Figure 5:
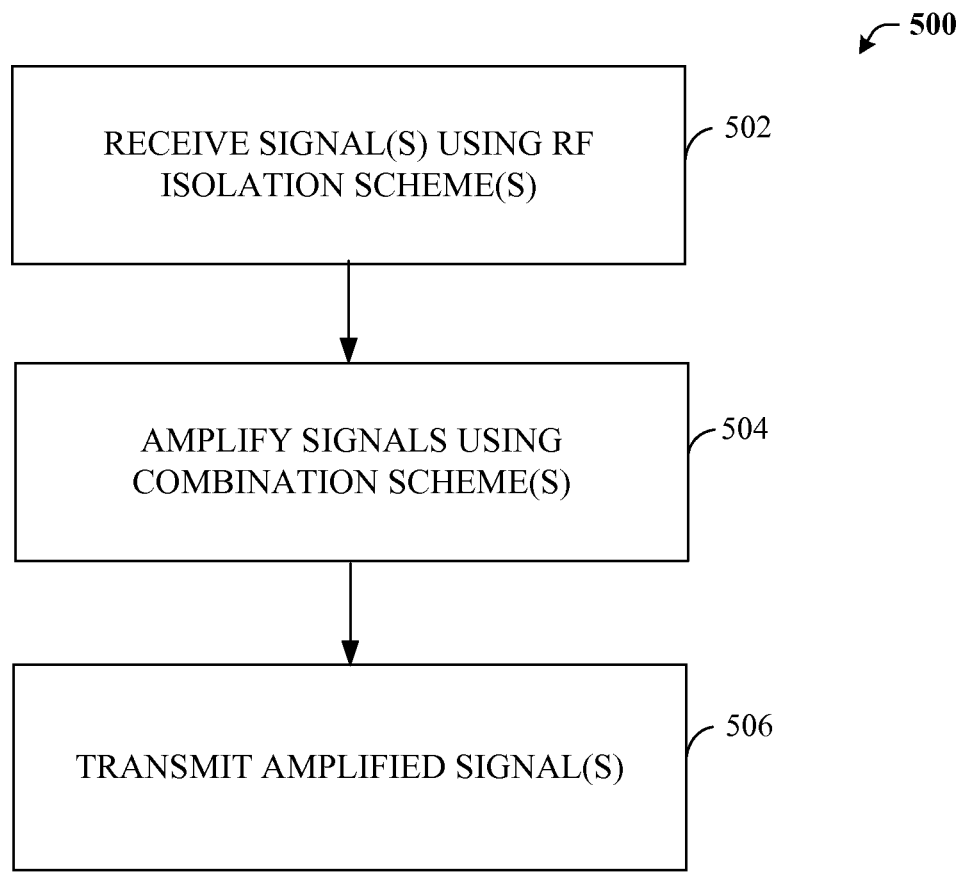
FIG. 5 is a flowchart of a communication network using home network settings in a visiting network according to an aspect.

FIG. 5 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 5, a system 500 is depicted, which may include a repeater operable for MIMO communication. At reference numeral 502, a repeater may receive one or more signals using one or more isolation schemes. In one aspect, an isolation scheme may enable repeater to process signals using spatial separation. In another aspect, an isolation scheme may enable repeater to process signals using interference cancellations engines.

At reference numeral 504, at least a portion of the received signal is processed and/or amplified using one or more combination schemes. In one aspect, determining which scheme to use depending on the number of donor antennas and server antennas available. For example, when the number of available Rx and Tx antennas is equal, then each Tx antenna may retransmit an amplified version of the signal received on a corresponding Rx antenna. As such there may be a one-to-one mapping between Tx and Rx antennas. In another example, when the number of Tx antennas is less than the number of Rx antennas, the Tx antennas may retransmit signals from a selected Rx antenna or a combination of signals from multiple Rx antennas. In such an aspect, for example, with two Rx antennas and one Tx antenna, the repeater may transmit the sum of signals received on the 2 Rx antennas, or the combination of signals from 2 Rx antennas through maximum ratio combining, equal gain combining, etc. In another example, when the number of Tx antennas is more than the number of Rx antennas, different Tx antennas may transmit substantially identical waveforms. In such an aspect, for example, with one Rx antenna and two Tx antennas, the repeater may transmit substantially the same signals on two Tx antennas, both being amplified versions of the signal received on the Rx antenna. Further, in one aspect, a combination scheme may be operable to combine inputs across antennas with variable delays in order to achieve delay diversity. At reference numeral 506, the processed and/or amplified signals may be transmitted by the repeater.

Figure 6:
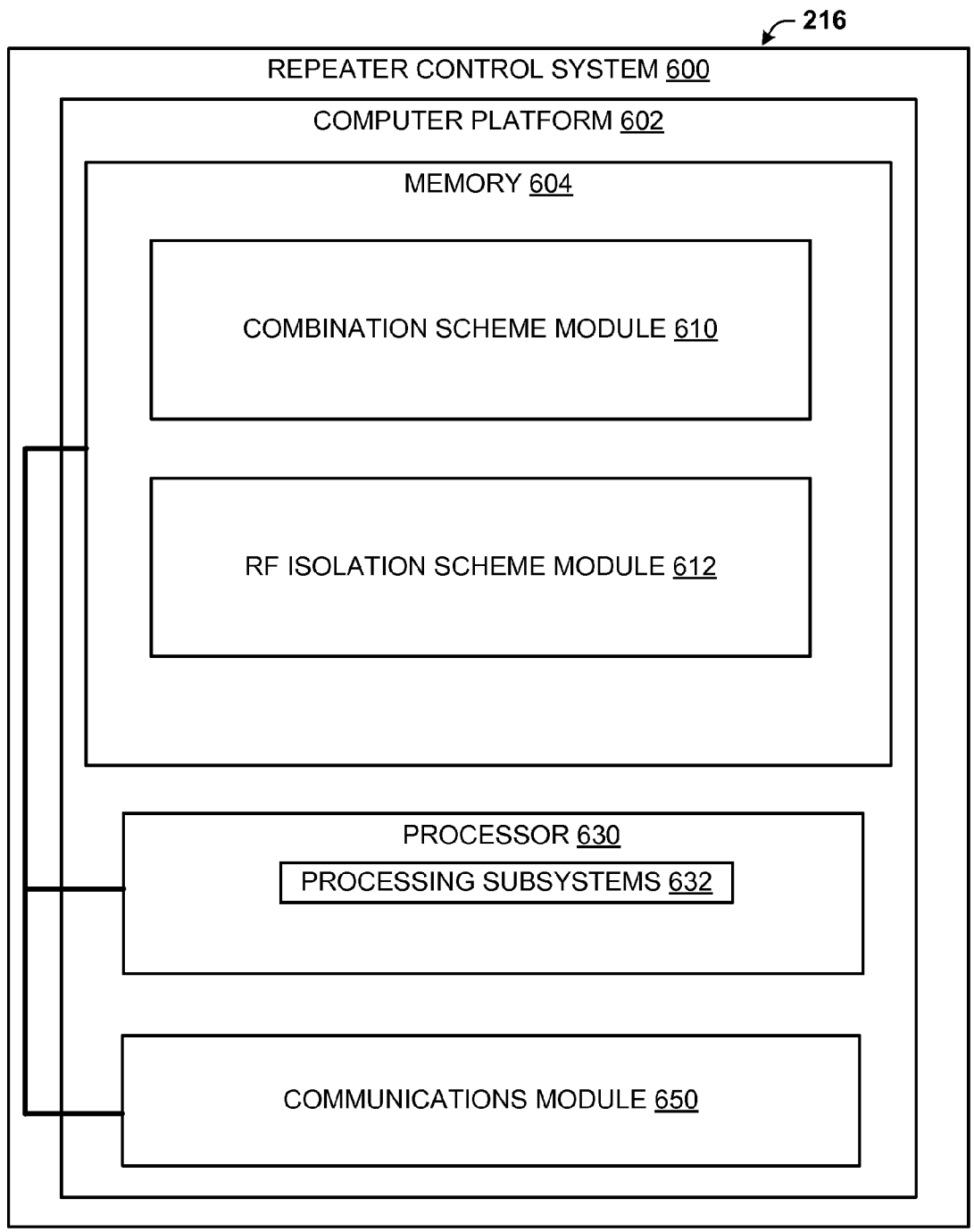
FIG. 6 illustrates exemplary block diagram of repeater control system according to an aspect.

With reference to FIG. 6, illustrated is a detailed block diagram of repeater control system 600, such as repeater 216 depicted in FIG. 2. Repeater control system 600 may comprise at least one of any type of hardware, server, personal computer, mini computer, mainframe computer, or any computing device either special purpose or general computing device. Further, the modules and applications described herein as being operated on or executed by repeater control system 600 may be executed entirely on a single network device, as shown in FIG. 2, or alternatively, in other aspects, separate servers, databases or computer devices may work in concert to provide data in usable formats to parties, and/or to provide a separate layer of control in the data flow between UEs 206, eNodeB 204, and the modules and applications executed by repeater control system 600.

Repeater control system 600 includes computer platform 602 that can transmit and receive data across wired and wireless networks, and that can execute routines and applications.

Computer platform 602 includes memory 604, which may comprise volatile and nonvolatile memory such as read-only and/or random-access memory (ROM and RAM), EPROM, EEPROM, flash cards, or any memory common to computer platforms. Further, memory 604 may include one or more flash memory cells, or may be any secondary or tertiary storage device, such as magnetic media, optical media, tape, or soft or hard disk. Further, computer platform 602 also includes processor 630, which may be an application-specific integrated circuit ("ASIC"), or other chipset, logic circuit, or other data processing device. Processor 630 may include various processing subsystems 632 embodied in hardware, firmware, software, and combinations thereof, that enable the functionality of repeater control system 600 and the operability of the network device on a wired or wireless network.

Computer platform 602 further includes communications module 650 embodied in hardware, firmware, software, and combinations thereof, that enables communications among the various components of repeater control system 600, as well as between repeater control system 600, eNodeB 204 and UE 206. Communications module 650 may include the requisite hardware, firmware, software and/or combinations thereof for establishing a wireless communication connection. According to described aspects, communication module 650 may include the necessary hardware, firmware and/or software to facilitate wireless broadcast, multicast and/or unicast communication of requested content items, control information, applications, etc.

Memory 604 of repeater control system 600 includes combination scheme module 610 and RF isolation scheme module 612. In one aspect, repeater control system 600 may include combination scheme module 610 and RF isolation scheme module 612. In one aspect, combination scheme module 610 may be operable to apply one or more combination schemes to a received signal to maintain signal integrity, for example, to maintain MIMO communications, diversity, etc. In one aspect, selection of an applicable combination scheme may be determined through analysis of equation (2) as discussed above.

In one aspect, combination scheme module 610 may determine which scheme to use depending on the number of donor antennas and server antennas available. For example, when the number of available Rx and Tx antennas is equal, then each Tx antenna may retransmit an amplified version of the signal received on a corresponding Rx antenna. As such there may be a one-to-one mapping between Tx and Rx antennas. In another example, when the number of Tx antennas is less than the number of Rx antennas, the Tx antennas may retransmit signals from a selected Rx antenna or a combination of signals from multiple Rx antennas. In such an aspect, for example, with two Rx antennas and one Tx antenna, the repeater may transmit the sum of signals received on the two Rx antennas, or the combination of signals from two Rx antennas through maximum ratio combining, equal gain combining, etc. In another example, when the number of Tx antennas is more than the number of Rx antennas, different Tx antennas may transmit substantially identical waveforms. In such an aspect, for example, with one Rx antenna and two Tx antennas, the repeater may transmit substantially the same signals on two Tx antennas, both being amplified versions of the signal received on the Rx antenna. Further, in one aspect, combination scheme module 610 may be operable to combine inputs across antennas with variable delays in order to get delay diversity.

In another aspect, RF isolation scheme module 612 may be operable to implement one or more RF isolations schemes to reduce potential feedback. In one aspect, RF isolation scheme module 612 may enable repeater control system 600 to process signals using spatial separation. For example, donor antennas and server antennas of repeater control system 600 may be placed with sufficient spatial separation so that the donor antennas may be exposed to little interference from the server antennas 420. For example, the donor antennas may be placed on rooftop while the server antennas are placed indoors. In another aspect, RF isolation scheme module 612 may enable repeater control system 600 to process signals using interference cancellations engines. For example, interference cancellation engines can be used to cancel signals picked up by the donor antennas that come from the server antennas. Assuming M server antennas and N donor antennas, M×N interference cancellation engines may be used as each donor antenna may cancel M signal streams from M server antennas, thereby using M interference cancellation engines per donor antenna. In one aspect, the $A_{n,m}$ obtainable by repeater control system 600 may be dependent on how much signal isolation may be achieved.

Figure 7:
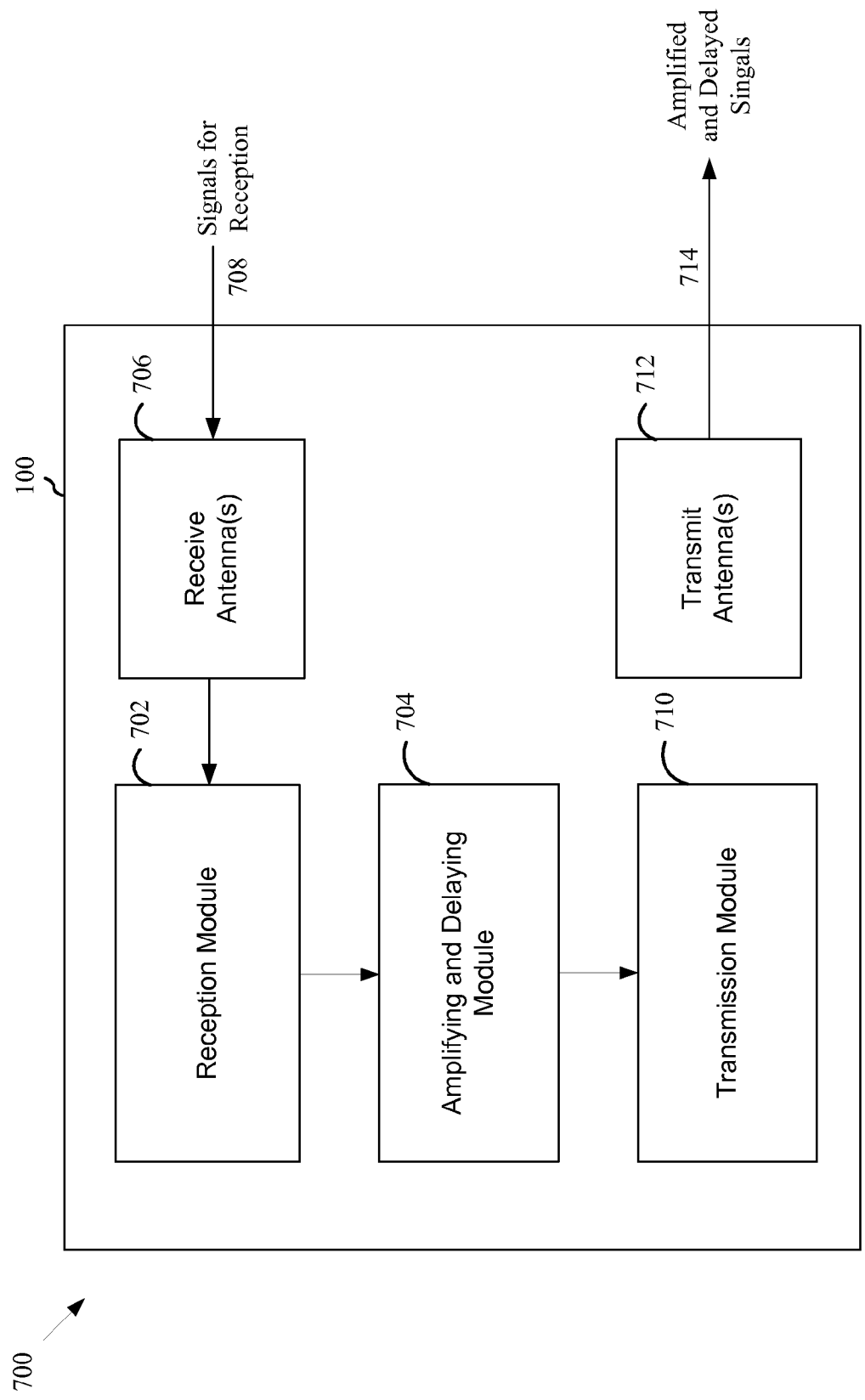
FIG. 7 is a conceptual block diagram illustrating the functionality of an exemplary apparatus.

FIG. 7 is a conceptual block diagram 700 illustrating the functionality of an exemplary apparatus 100. The apparatus 100 includes a reception module 702 that receives, through one or more receive antennas 708, one or more signals 708 using one or more radio RF isolation schemes, an amplifying and delaying module 704 that amplifies and delays the one or more signals using one or more combination schemes, and a transmission module 710 that transmits, through one or more transmit antennas 712, the amplified and delayed one or more signals 714. In one aspect, at least one of the one or more receive antennas 706 or the one or more transmit antennas 712 includes two or more antennas. The apparatus 100 may include additional modules that perform each of the steps in the aforementioned flowchart. As such, each step in the aforementioned flow charts may be performed by a module and the apparatus 100 may include one or more of those modules.

In one configuration, the apparatus 100 includes means for receiving, by one or more receive antennas, one or more signals using one or more RF isolation schemes, means for amplifying and delaying the one or more signals using one or more combination schemes, and means for transmitting, by one or more transmit antennas, the combined one or more signals, wherein at least one of the one or more receive antennas or the one or more transmit antennas includes two or more antennas. In another configuration, the apparatus 100 includes means for amplifying and delaying each of the one or more signals received by each of the one or more receive antennas, where the repeater is configured to receive the one or more signals on an equal number of receive and transmit antennas, and means for providing the amplified and delayed signals to corresponding transmit antennas, where each transmit antenna corresponds to a receive antenna. In another configuration, the apparatus 100 includes means for analyzing the one or more received signals, wherein the repeater is configured to receive the one or more signals on a greater number of receive antennas than transmit antennas, through means for combining one or more of the received signals, or means for selecting at least one or the one or more received signals, and means for providing at least one of the combined or selected signals to the one or more transmit antennas. In another configuration, the apparatus 100 includes means for generating multiple instances of the one or more received signals, wherein the repeater is configured to receive the one or more signals on a lesser number of receive antennas than transmit antennas, and means for providing each of the one or more transmit antennas with one of the multiple instances. In another configuration, the apparatus 100 includes means for applying a delay to at least one of the one or more received signals. In another configuration, the apparatus 100 includes means for using spatial isolation between the one or more receive antennas and the one or more transmit antennas, or means for using a plurality of interference cancellation engines. In another configuration, the apparatus 100 includes means for applying a number of interference cancellation engines equal to the number of transmit antennas to each of the number of receive antennas.

The aforementioned means may be one or more of the aforementioned modules of the apparatus 100 (see FIG. 6) and/or the processing system 114 configured to perform the functions recited by the aforementioned means. As described supra, the processing system 114 includes the processor 630, and communications module 650. As such, in one configuration, the aforementioned means may be the TX processor 630, and communications module 650 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or UE. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for wireless communications for a repeater in a communication system using orthogonal frequency division multiplexing on the downlink, comprising:
   receiving, by one or more receive antennas, one or more signals using one or more radio frequency (RF) isolation schemes;
   amplifying and delaying the one or more signals using one or more combination schemes; and
   transmitting, by one or more transmit antennas, the amplified and delayed one or more signals, wherein at least one of the one or more receive antennas or the one or more transmit antennas includes two or more antennas,
   wherein the one or more combination schemes are determined based on a number of the one or more receive antennas and a number of the one or more transmit antennas, and
   wherein the one or more combination schemes are based on an equation:

$$y(m) = \sum_{n=1}^{N} x_n(t - D_{n,m}) \cdot A_{n,m},$$

wherein n=1, ..., N and N is the number of the one or more receive antennas, $x_n$ is a received signal on an n-th receive antenna of the one or more receive antennas, y(m) is a transmitted signal on an m-th transmit antenna of the one or more transmit antennas where m=1, ..., M and M is the number of the one or more transmit antennas, $D_{n,m}$ is a delay applied to a signal received on the n-th receive antenna at an m-th transmit antenna, and $A_{n,m}$ is a scaling factor applied to a signal received on the n-th receive antenna at the m-th transmit antenna.

2. The method of claim 1, wherein the amplifying and delaying further comprises:
   amplifying and delaying each of the one or more signals received by each of the one or more receive antennas, wherein the repeater is configured to receive the one or more signals on an equal number of receive and transmit antennas; and
   providing the amplified and delayed signals to corresponding transmit antennas, wherein each transmit antenna corresponds to a receive antenna.

3. The method of claim 1, wherein the amplifying and delaying further comprises:
   analyzing the one or more received signals, wherein the number of receive antennas is greater than the number of transmit antennas, by at least one of:
   combining one or more of the received signals; or
   selecting at least one or the one or more received signals; and
   providing at least one of the combined or selected signals to the one or more transmit antennas.

4. The method of claim 3, wherein the combining comprises at least one of:
   signal addition;
   maximum ratio combining; or
   equal gain combining.

5. The method of claim 1, wherein the amplifying and delaying further comprises:
   generating multiple instances of the one or more received signals, wherein the repeater is configured to receive the one or more signals on a lesser number of receive antennas than transmit antennas; and
   providing each of the one or more transmit antennas with one of the multiple instances.

6. The method of claim 1, wherein the amplifying and delaying further comprises:
   applying a delay to at least one of the one or more received signals.

7. The method of claim 1, wherein the one or more RF isolation schemes comprise at least one of:

using spatial isolation between the one or more receive antennas and the one or more transmit antennas; or using a plurality of interference cancellation engines.

8. The method of claim 7, wherein the plurality of interference cancellation engines comprises:

applying a number of interference cancellation engines equal to the number of transmit antennas to each of the number of receive antennas.

9. The method of claim 1, wherein the one or more received signals enable at least one of: transmit diversity, or MIMO communications.

10. The method of claim 1, wherein the amplifying and delaying further comprises:

applying at least one of a complex-valued scaling factor or a delay value to each of the one or more received signals.

11. The method of claim 1, wherein the one or more receive antennas comprises a plurality of receive antennas, wherein the plurality of receive antennas are at least partially cross-polarized.

12. The method of claim 1, wherein the one or more transmit antennas comprises a plurality of transmit antennas, wherein the plurality of transmit antennas are at least partially cross-polarized.

13. The method of claim 12, wherein the one or more receive antennas comprises a plurality of receive antennas, wherein the plurality of receive antennas are at least partially cross-polarized.

14. A repeater for wireless communications in a communication system using orthogonal frequency division multiplexing on the downlink, comprising:

means for receiving, by one or more receive antennas, one or more signals using one or more radio frequency (RF) isolation schemes;

means for amplifying and delaying the one or more signals using one or more combination schemes; and means for transmitting, by one or more transmit antennas, the combined one or more signals, wherein at least one of the one or more receive antennas or the one or more transmit antennas includes two or more antennas, wherein the one or more combination schemes are determined based on a number of the one or more receive antennas and a number of the one or more transmit antennas, and wherein the one or more combination schemes are based on an equation:

$$y(m) = \sum_{n=1}^{N} x_n(t - D_{n,m}) \cdot A_{n,m},$$

wherein n=1, ..., N and N is the number of the one or more receive antennas, $x_n$ is a received signal on an n-th receive antenna of the one or more receive antennas, y(m) is a transmitted signal on an m-th transmit antenna of the one or more transmit antennas where m=1, ..., M and M is the number of the one or more transmit antennas, $D_{n,m}$ is a delay applied to a signal received on the n-th receive antenna at an m-th transmit antenna, and $A_{n,m}$ is a scaling factor applied to a signal received on the n-th receive antenna at the m-th transmit antenna.

15. The repeater of claim 14, wherein the means for amplifying and delaying further comprises:

means for amplifying and delaying each of the one or more signals received by each of the one or more receive antennas, wherein the repeater is configured to receive the one or more signals on an equal number of receive and transmit antennas; and means for providing the amplified and delayed signals to corresponding transmit antennas, wherein each transmit antenna corresponds to a receive antenna.

16. The repeater of claim 14, wherein the means for amplifying and delaying further comprises:

means for analyzing the one or more received signals, wherein the repeater is configured to receive the one or more signals on a greater number of receive antennas than transmit antennas, by at least one of:

means for combining one or more of the received signals; or means for selecting at least one or the one or more received signals; and means for providing at least one of the combined or selected signals to the one or more transmit antennas.

17. The repeater of claim 16, wherein the means for combining comprises at least one of:

signal addition;

maximum ratio combining; or equal gain combining.

18. The repeater of claim 14, wherein the means for amplifying and delaying further comprises:

means for generating multiple instances of the one or more received signals, wherein the repeater is configured to receive the one or more signals on a lesser number of receive antennas than transmit antennas; and means for providing each of the one or more transmit antennas with one of the multiple instances.

19. The repeater of claim 14, wherein the means for amplifying and delaying further comprises:

means for applying a delay to at least one of the one or more received signals.

20. The repeater of claim 14, wherein the one or more RF isolation schemes comprise at least one of:

means for using spatial isolation between the one or more receive antennas and the one or more transmit antennas; or means for using a plurality of interference cancellation engines.

21. The repeater of claim 20, wherein the plurality of interference cancellation engines comprises:

means for applying a number of interference cancellation engines equal to the number of transmit antennas to each of the number of receive antennas.

22. The repeater of claim 14, wherein the one or more received signals enable at least one of: transmit diversity, or MIMO communications.

23. The repeater of claim 14, wherein the means for amplifying and delaying further comprises:

means for applying at least one of a complex-valued scaling factor or a delay value to each of the one or more received signals.

24. The repeater of claim 14, wherein the one or more receive antennas comprises a plurality of receive antennas, wherein the plurality of receive antennas are at least partially cross-polarized.

25. The repeater of claim 14, wherein the one or more transmit antennas comprises a plurality of transmit antennas, wherein the plurality of transmit antennas are at least partially cross-polarized.

26. The repeater of claim 25, wherein the one or more receive antennas comprises a plurality of receive antennas, wherein the plurality of receive antennas are at least partially cross-polarized.

27. At least one processor configured to facilitate wireless communications for a repeater in a communication system using orthogonal frequency division multiplexing on the downlink, comprising:
- a first module for receiving, by one or more receive antennas, one or more signals using one or more radio frequency (RF) isolation schemes;
- a second module for amplifying and delaying the one or more signals using one or more combination schemes; and
- a third module for transmitting, by one or more transmit antennas, the amplified and delayed one or more signals, wherein at least one of the one or more receive antennas or the one or more transmit antennas includes two or more antennas,
- wherein the one or more combination schemes are determined based on a number of the one or more receive antennas and a number of the one or more transmit antennas, and
- wherein the one or more combination schemes are based on an equation:

$$y(m) = \sum_{n=1}^{N} x_n(t - D_{n,m}) \cdot A_{n,m},$$

wherein n=1, ..., N and N is the number of the one or more receive antennas, $x_n$ is a received signal on an n-th receive antenna of the one or more receive antennas, y(m) is a transmitted signal on an m-th transmit antenna of the one or more transmit antennas where m=1, ..., M and M is the number of the one or more transmit antennas, $D_{n,m}$ is a delay applied to a signal received on the n-th receive antenna at an m-th transmit antenna, and $A_{n,m}$ is a scaling factor applied to a signal received on the n-th receive antenna at the m-th transmit antenna.

28. The at least one processor of claim 27, wherein the module for amplifying and delaying further comprises:
- a module for amplifying and delaying each of the one or more signals received by each of the one or more receive antennas, wherein the repeater is configured to receive the one or more signals on an equal number of receive and transmit antennas; and
- a module for providing the amplified and delayed signals to corresponding transmit antennas, wherein each transmit antenna corresponds to a receive antenna.

29. The at least one processor of claim 27, wherein the module for amplifying and delaying further comprises:
- a module for analyzing the one or more received signals, wherein the repeater is configured to receive the one or more signals on a greater number of receive antennas than transmit antennas, by at least one of:
  - a module for combining one or more of the received signals; or
  - a module for selecting at least one or the one or more received signals; and
  - a module for providing at least one of the combined or selected signals to the one or more transmit antennas.

30. The at least one processor of claim 29, wherein the module for combining comprises at least one of:
- a module for signal addition;
- a module for maximum ratio combining; or
- a module for equal gain combining.

31. The at least one processor of claim 27, wherein the module for amplifying and delaying further comprises:

- a module for generating multiple instances of the one or more received signals, wherein the repeater is configured to receive the one or more signals on a lesser number of receive antennas than transmit antennas; and
- a module for providing each of the one or more transmit antennas with one of the multiple instances.

32. The at least one processor of claim 27, wherein the module for amplifying and delaying further comprises:
- a module for applying a delay to at least one of the one or more received signals.

33. The at least one processor of claim 27, wherein the module for receiving using the one or more RF isolation schemes comprise at least one of:
- a module for using spatial isolation between the one or more receive antennas and the one or more transmit antennas; or
- a module for using a plurality of interference cancellation engines.

34. The at least one processor of claim 33, wherein the module for using the plurality of interference cancellation engines comprises:
- a module for applying a number of interference cancellation engines equal to the number of transmit antennas to each of the number of receive antennas.

35. The at least one processor of claim 27, wherein the one or more received signals enable at least one of: transmit diversity, or MIMO communications.

36. The at least one processor of claim 27, wherein the module for amplifying and delaying further comprises:
- a module for applying at least one of a complex-valued scaling factor or a delay value to each of the one or more received signals.

37. The at least one processor of claim 27, wherein the one or more receive antennas comprises a plurality of receive antennas, wherein the plurality of receive antennas are at least partially cross-polarized.

38. The at least one processor of claim 27, wherein the one or more transmit antennas comprises a plurality of transmit antennas, wherein the plurality of transmit antennas are at least partially cross-polarized.

39. The at least one processor of claim 38, wherein the one or more receive antennas comprises a plurality of receive antennas, wherein the plurality of receive antennas are at least partially cross-polarized.

40. A computer program product, comprising:
a non-transitory computer-readable medium comprising:
- a first set of codes for causing a computer to receive, by one or more receive antennas, one or more signals using one or more radio frequency (RF) isolation schemes;
- a second set of codes for causing the computer to amplify and delay the one or more signals using one or more combination schemes; and
- a third set of codes for causing the computer to transmit, by one or more transmit antennas, the amplified and delayed one or more signals, wherein at least one of the one or more receive antennas or the one or more transmit antennas includes two or more antennas,
- wherein the one or more combination schemes are determined based on a number of the one or more receive antennas and a number of the one or more transmit antennas, and
- wherein the one or more combination schemes are based on an equation:

$$y(m) = \sum_{n=1}^{N} x_n(t - D_{n,m}) \cdot A_{n,m},$$

wherein n=1, . . . , N and N is the number of the one or more receive antennas, $x_n$ is a received signal on an n-th receive antenna of the one or more receive antennas, y(m) is a transmitted signal on an m-th transmit antenna of the one or more transmit antennas where m=1, . . . , M and M is the number of the one or more transmit antennas, $D_{n,m}$ is a delay applied to a signal received on the n-th receive antenna at an m-th transmit antenna, and $A_{n,m}$ is a scaling factor applied to a signal received on the n-th receive antenna at the m-th transmit antenna.

41. The computer program product of claim 40, wherein the codes to amplify and delay further comprise:
   codes for amplifying and delaying each of the one or more signals received by each of the one or more receive antennas, wherein the repeater is configured to receive the one or more signals on an equal number of receive and transmit antennas; and
   codes for providing the amplified and delayed signals to corresponding transmit antennas, wherein each transmit antenna corresponds to a receive antenna.

42. The computer program product of claim 40, wherein the codes to amplify and delay further comprise:
   codes for analyzing the one or more received signals, wherein the repeater is configured to receive the one or more signals on a greater number of receive antennas than transmit antennas, by at least one of:
      codes for combining one or more of the received signals; or
      codes for selecting at least one or the one or more received signals; and
   codes for providing at least one of the combined or selected signals to the one or more transmit antennas.

43. The computer program product of claim 42, wherein the codes for combining further comprise at least one of:
   codes for signal addition;
   codes for maximum ratio combining; or
   codes for equal gain combining.

44. The computer program product of claim 40, wherein the codes to amplify and delay further comprise:
   codes for generating multiple instances of the one or more received signals, wherein the repeater is configured to receive the one or more signals on a lesser number of receive antennas than transmit antennas; and
   codes for providing each of the one or more transmit antennas with one of the multiple instances.

45. The computer program product of claim 40, wherein the codes to amplify and delay further comprise:
   codes for applying a delay to at least one of the one or more received signals.

46. The computer program product of claim 40, wherein the codes for receiving further comprise at least one of:
   codes for using spatial isolation between the one or more receive antennas and the one or more transmit antennas; or
   codes for using a plurality of interference cancellation engines.

47. The computer program product of claim 46, wherein the codes for using the plurality of interference cancellation engines comprises:
   codes for applying a number of interference cancellation engines equal to the number of transmit antennas to each of the number of receive antennas.

48. The computer program product of claim 40, wherein the one or more received signals enable at least one of: transmit diversity, or MIMO communications.

49. The computer program product of claim 40, wherein the codes to amplify and delay further comprises:
   codes for applying at least one of a complex-valued scaling factor or a delay value to each of the one or more received signals.

50. The computer program product of claim 40, wherein the one or more receive antennas comprises a plurality of receive antennas, wherein the plurality of receive antennas are at least partially cross-polarized.

51. The computer program product of claim 40, wherein the one or more transmit antennas comprises a plurality of transmit antennas, wherein the plurality of transmit antennas are at least partially cross-polarized.

52. The computer program product of claim 51, wherein the one or more receive antennas comprises a plurality of receive antennas, wherein the plurality of receive antennas are at least partially cross-polarized.

53. The method of claim 1, wherein, based on the one or more combination schemes, if the number of the one or more transmit antennas is equal to the number of the one or more receive antennas, each of the one or more transmit antennas retransmits an amplified version of a signal received on a corresponding receive antenna of the one or more receive antennas,
   wherein, based on the one or more combination schemes, if the number of the one or more transmit antennas is less than the number of the one or more receive antennas, the one or more transmit antennas transmits a signal from a selected receive antenna of the one or more receive antennas or transmits a combination of signals from the one or more receive antennas, and
   wherein, based on the one or more combination schemes, if the number of the one or more transmit antennas is greater than the number of the one or more receive antennas, the one or more transmit antennas transmit substantially identical waveforms.

54. The repeater of claim 14, wherein, based on the one or more combination schemes, if the number of the one or more transmit antennas is equal to the number of the one or more receive antennas, each of the one or more transmit antennas retransmits an amplified version of a signal received on a corresponding receive antenna of the one or more receive antennas,
   wherein, based on the one or more combination schemes, if the number of the one or more transmit antennas is less than the number of the one or more receive antennas, the one or more transmit antennas transmits a signal from a selected receive antenna of the one or more receive antennas or transmits a combination of signals from the one or more receive antennas, and
   wherein, based on the one or more combination schemes, if the number of the one or more transmit antennas is greater than the number of the one or more receive antennas, the one or more transmit antennas transmit substantially identical waveforms.

55. The at least one processor of claim 27, wherein, based on the one or more combination schemes, if the number of the one or more transmit antennas is equal to the number of the one or more receive antennas, each of the one or more transmit antennas retransmits an amplified version of a signal received on a corresponding receive antenna of the one or more receive antennas, wherein, based on the one or more combination schemes, if the number of the one or more transmit antennas is less than the number of the one or more receive antennas, the one or more transmit antennas transmits a signal from a selected receive antenna of the one or more receive antennas or transmits a combination of signals from the one or more receive antennas, and wherein, based on the one or more combination schemes, if the number of the one or more transmit antennas is greater than the number of the one or more receive antennas, the one or more transmit antennas transmit substantially identical waveforms.

56. The computer program product of claim 40, wherein, based on the one or more combination schemes, if the number of the one or more transmit antennas is equal to the number of the one or more receive antennas, each of the one or more transmit antennas retransmits an amplified version of a signal received on a corresponding receive antenna of the one or more receive antennas, wherein, based on the one or more combination schemes, if the number of the one or more transmit antennas is less than the number of the one or more receive antennas, the one or more transmit antennas transmits a signal from a selected receive antenna of the one or more receive antennas or transmits a combination of signals from the one or more receive antennas, and wherein, based on the one or more combination schemes, if the number of the one or more transmit antennas is greater than the number of the one or more receive antennas, the one or more transmit antennas transmit substantially identical waveforms.

\* \* \* \* \*